United States Patent [19]
Yamazaki et al.

[11] Patent Number: 5,885,544
[45] Date of Patent: *Mar. 23, 1999

[54] LITHIUM COBALTATE BASED POSITIVE ELECTRODE-ACTIVE MATERIAL FOR LITHIUM SECONDARY CELL AND METHOD OF MANUFACTURING SAME

[75] Inventors: Nobuyuki Yamazaki; Kathuyuki Negishi, both of Tokyo, Japan

[73] Assignee: Nippon Chemical Industrial Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 729,527

[22] Filed: Oct. 11, 1996

[51] Int. Cl.$^6$ .............................. C01D 15/00; C01G 51/00
[52] U.S. Cl. ............................................. 423/594; 429/218
[58] Field of Search ............................... 423/594; 429/218

[56] References Cited

U.S. PATENT DOCUMENTS

| | | | |
|---|---|---|---|
| 4,686,160 | 8/1987 | Yoshino et al. | 429/197 |
| 5,478,673 | 12/1995 | Funatsu | 429/197 |
| 5,478,674 | 12/1995 | Miyasaka | 429/223 |
| 5,487,960 | 1/1996 | Tanaka | 429/223 |
| 5,503,930 | 4/1996 | Maruyama et al. | 429/223 |
| 5,589,298 | 12/1996 | Takada et al. | 429/218 |

*Primary Examiner*—Steven Bos
*Attorney, Agent, or Firm*—Oblon, Spivak, McClelland, Maier & Neustadt, P.C.

[57] ABSTRACT

A lithium cobaltate based positive electrode-active material for a lithium secondary cell consisting of lithium cobaltate ($LiCoO_2$) having 0.5% by weight or less of free cobalt oxide ($Co_3O_4$). According to the present invention, it is possible to provide a lithium cobaltate based positive electrode-active material which has excellent discharge capacity and capacity holding rate and gives a high energy density, suitable for a lithium secondary cell.

7 Claims, 1 Drawing Sheet

LITHIUM COBALTATE BASED POSITIVE ELECTRODE-ACTIVE MATERIAL FOR LITHIUM SECONDARY CELL AND METHOD OF MANUFACTURING SAME

BACKGROUND OF THE INVENTION

1. Field of the Invention

The present invention relates to a lithium cobaltate based positive electrode-active material for a lithium secondary cell having excellent energy density and a method of manufacturing same.

2. Discussion of the Background

Along with the recent rapid progress in electronic equipment toward portable and cordless domestic appliances, the use of lithium secondary cells as power sources for such compact electronic appliances has also increased. In 1980, Mizushima et al. reported the usefulness of lithium cobaltate as a positive electrode-active material for a lithium secondary cell ["Material Research Bulletin" vol. 15, p. 783–789 (1980)], and since then, research and development efforts regarding lithium cobaltate based positive electrode-active materials have been made, resulting in many proposals on the subject to date.

These conventional proposals cover techniques for achieving a high energy density for a positive electrode-active material such as, for example, one using the chemical composition $Li_xCoO_2$, where, $1.05 \leq x \leq 1.3$, of lithium cobaltate, thereby achieving a material rich in lithium (Japanese Patent Laid-Open No. 3-127454), one achieving in contrast a higher cobalt concentration by using the chemical composition $Li_xCoO_2$, where, $0 \leq x \leq 1$, (Japanese Patent Laid-Open No. 3-134969), ones doping metal ions such as Mn, W, Ni, La and Zr (Japanese Patent Laid-Open Nos. 3-201368, 4-328277, 4-319259 and 4-319260), and one setting out residual $Li_2CO_3$ of up to 10 wt % in lithium cobaltate (Japanese Patent Laid-Open No. 4-56064).

On the other hand, the known techniques requiring specific physical features of the lithium cobaltate based positive electrode-active material include one using an $LiCoO_2$ specific area of up to 2 $m^2/g$ (Japanese Patent Laid-Open No. 4-56064), one using amorphous $LiCoO_2$ (Japanese Patent Laid-Open No. 5-21066), ones imparting specific particle size properties to $LiCoO_2$ (Japanese Patent Laid-Open Nos. 4-33260 and 5-94822), and ones setting forth $LiCoO_2$ crystal grains having a specific X-ray diffraction intensity (Japanese Patent Laid-Open Nos. 3-272564 and 5-36414). Diverse and various proposals for methods of manufacturing a lithium cobaltate based positive electrode-active material include, for example, Japanese Patent Laid-Open Nos. 3-285262, 4-249074, 4-123762, 5-54886, 5-54888, 5-62678 and 5-182667.

In general, lithium cobaltate used as a positive electrode-active material for a lithium secondary cell is manufactured, for example, by mixing a lithium salt such as lithium carbonate and a cobalt compound such as cobalt oxide so as to give an atomic ratio of Li/Co within a range of from 0.9 to 1.2, and firing the resultant mixture at a temperature within a range of from 600° to 1,100° C. Physical and chemical properties of the resulting $LiCoO_2$ delicately and diversely vary with such firing conditions as the heating rate and the firing atmosphere, which exert considerable effects on performance of the positive electrode-active material including such characteristics as discharge capacity and charge and discharge cycle.

The present inventors carried out extensive studies, placing emphasis on the foregoing phenomenon, and confirmed that a composition with a slight content of free cobalt oxide in lithium cobaltate could display excellent energy density performance, and that such a composition could be manufactured under specific firing conditions.

The present invention was developed on the basis of the foregoing findings, and is aimed at providing a lithium cobaltate based positive electrode-active material for a lithium secondary cell having high energy density and a method of industrially manufacturing same.

SUMMARY OF THE INVENTION

A characterizing feature of the present invention lies in the lithium cobaltate based positive electrode-active material for a lithium secondary cell consisting of lithium cobaltate ($LiCoO_2$) having 0.5% by weight or less of free cobalt oxide ($Co_3O_4$).

When free cobalt oxide ($Co_3O_4$) is contained in an amount over 0.5% by weight in lithium cobaltate ($LiCoO_2$), discharge capacity and capacity holding rate decrease, thus making it impossible to form a positive electrode-active material for a lithium secondary cell, having excellent energy density. The content of free cobalt oxide ($Co_3O_4$) should therefore be up to 0.5% by weight, or more preferably, up to 0.3% by weight.

With a view to obtaining the lithium cobaltate based positive electrode-active material for a lithium secondary cell having the foregoing chemical composition, the method of manufacturing same according to the present invention comprises the step of: firing a mixture of lithium carbonate and cobalt oxide at a temperature of 600° to 1100° C. while controlling the oxygen concentration in the firing atmosphere to at least 5% by volume, and setting a heating rate of up to 5° C./min at a heating temperature of 500° C. or more, thereby converting the mixture into lithium cobaltate.

DETAILED DESCRIPTION OF THE INVENTION

Regarding lithium carbonate and cobalt oxide serving as the starting raw materials, there are no particular requirements regarding their manufacturing history. It is however desirable to select raw materials having the smallest possible contents of impurities. A precursor material such as a hydroxide of lithium or cobalt may be partially added as required. When mixing lithium carbonate and cobalt oxide, the mixing ratio as expressed by Li/Co ratio is set at about 1, although some slight variance over and under the foregoing value of 1 may be acceptable. The Li/Co ratio should preferably be within a range of from 0.99 to 1.10.

The mixture of lithium carbonate and cobalt oxide is then charged into a reaction vessel such as a heat-resistant crucible which is then set in a heating furnace to conduct a firing treatment at a temperature within a range of from 600° to 1,100° C., or more preferably, from 800° to 1,000° C. Among firing conditions here, the firing atmosphere should be controlled so as to give an oxygen concentration of at least 5% by volume, and the heating rate within the heating temperature range of at least 500° C. should be controlled to up to 5° C./minute, or more preferably, to up to 2° C./minute. These conditions must simultaneously be satisfied. For example, when the heating rate at a temperature of at least 500° C. is over 5° C./minute even when the oxygen concentration in the firing atmosphere exceeds 5% by volume, or when the oxygen concentration is under 5% by volume even under a slow heating condition with a heating rate of under 5° C./minute, it is impossible to obtain lithium cobaltate having a free cobalt oxide ($Co_3O_4$) of up to 0.5% by weight. More preferable firing conditions include an oxygen concentration in the firing atmosphere within a range of from 10 to 20% by volume, and a heating rate at a heating temperature of at least 500° C. within a range of from 2° to 0.6° C./minute. The oxygen concentration is measured with an oxygen concentration meter.

The firing time is such that temperature is raised to 600° to 1,100° C. under the foregoing conditions and is kept within this temperature range for at least two hours. The firing time may be longer, but should preferably be within a range of from about 5 to 15 hours, considering stability.

The firing treatment of the mixture of lithium carbonate and cobalt oxide under these specific conditions causes both components to react, transforming them into lithium cobaltate ($LiCoO_2$) having a free cobalt oxide ($Co_3O_4$) content of up to 0.5% by weight.

Although the present invention is defined by the claims, preferred embodiments are as follows.

(1) Lithium cobaltate with a content of free cobalt oxide ($Co_3O_4$) of up to 0.3% by weight.

(2) Firing conditions being set, wherein the oxygen concentration in the firing atmosphere is within a range of from about 10 to 20% by volume and the heating rate up to a heating temperature of at least 500° C. is within a range of from 2 to 0.6° C./minute.

Generally, lithium cobaltate used for the positive electrode-active material for a lithium secondary cell contains a cobalt oxide component due to non-reaction of the ingredients or other reasons. Any free cobalt oxide ($Co_3O_4$) in amounts of over a certain level, exerts an adverse effect on cell performance, and exhibits decreasing discharge capacity and capacity holding rate. With a cobalt oxide content of up to 0.5% by weight, however, it fully displays excellent discharge capacity and capacity holding rate. The lithium cobaltate based positive electrode-active material for a lithium secondary cell according to the present invention consists of lithium cobaltate ($LiCoO_2$) containing free cobalt oxide ($Co_3O_4$) in an amount of up to 0.5% by weight. It therefore has an excellent discharge capacity and capacity holding rate, thus always achieving a high energy density.

According to the manufacturing method of the present invention, it is possible to industrially produce, with high reproducibility, lithium cobaltate containing up to 0.5% by weight free cobalt oxide ($Co_3O_4$) as described above, by controlling, when converting the mixture of lithium carbonate and cobalt oxide into lithium cobaltate through heating and firing, the oxygen concentration in the firing atmosphere to at least 5% by volume, and adopting specific firing conditions in which the heating rate at a heating temperature of at least 500° C. is set to a value of up to 5° C./minute. Although the specific mechanism of this effect has not yet been clarified in detail, it is conjectured to be attributable to a mechanism in which the oxygen concentration in the firing atmosphere is related to the reaction rate, and the generation of lithium cobaltate proceeds slowly with the slow heating,.

EXAMPLES

Figure 1:
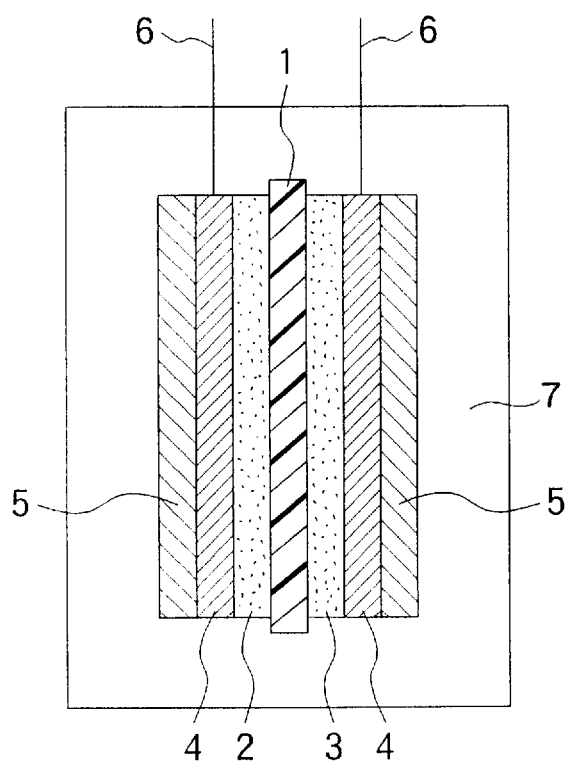
FIG. 1 is a explanatory sectional view of a lithium secondary cell assembled in the Examples.

The present invention will now be described below in detail by means of Examples and Comparative Examples.

Examples 1 to 8 and Comparative Examples 1 to 5:

(1) Manufacture of lithium cobaltate based positive electrode-active material for lithium secondary cell:

Lithium carbonate and cobalt oxide were weighed so as to give an Li/Co atomic ratio of 1 and sufficiently mixed in a mortar to prepare a uniform mixture. Then, a certain amount of the resultant mixture was placed in an aluminum crucible, charged into an electric heating furnace, and fired at a maximum temperature of 900° C. for ten hours. During firing, heating was conducted while controlling the oxygen concentration in the furnace atmosphere and adjusting the heating rate at a temperature region of at least 500° C. The resulting fired product was crushed, thereby manufacturing a lithium cobaltate based positive electrode-active material for a lithium secondary cell. The content of cobalt oxide ($Co_3O_4$) in each sample of lithium cobaltate ($LiCoO_2$) was measured by the X-ray diffraction method (CU-Kα), with the method quantitatively determining the diffraction intensity near $2\theta=31.3°$ caused by $Co_3O_4$.

(2) Preparation of a lithium secondary cell:

85 parts by of Lithium cobaltate ($LiCoO_2$) manufactured as above, 10 parts by weight of graphite powder and 5 parts by weight of polyvinylidene fluoride were mixed to form a positive electrode material, and this was dispersed in 2-methylpyrrolidone to prepare a kneaded paste. The resultant kneaded paste was applied to aluminum foil, dried and pressed under a pressure of 2 t/cm² to stamp a 2 cm square shape to form a positive electrode plate. A lithium secondary cell as shown in FIG. 1 was prepared by laminating individual members by the use of this positive electrode plate. In FIG. 1, numeral 1 denotes a separator; 2, a negative electrode; 3, a positive electrode; 4, a collector; 5, a tightening fitting; 6, an external terminal; and 7, an electrolyte. The negative electrode was a metal lithium foil. Further, the electrolyte 7 was constituted by 1-liter of a mixture of propylene carbonate with ethylene carbonate at a weight ratio of 1:1, in which 1 mol of $LiClO_4$ was dissolved.

(3) Evaluation of cell performance:

The prepared lithium secondary cell was operated and discharge capacity and capacity holding rate were measured to evaluate the cell performance. The results are shown in Table 1 in comparison with the firing conditions of (1) and the free cobalt oxide ($Co_3O_4$) content in lithium cobaltate ($LiCoO_2$). The discharge capacity was measured by charging the positive electrode with 1 mA/cm² to 4.2 V, then discharging it to 2.7 V, and repeating such a cycle of charging and discharging. The capacity holding rate was calculated from the result of repetition of the charge/discharge cycle as described above in accordance with the following formula:

[Capacity holding rate]=[Discharge capacity in 10th cycle]/[discharge capacity in 1st cycle]×100

TABLE 1

|  | firing conditions | | cell performance | |
| --- | --- | --- | --- | --- |
|  | heating rate °C./min | oxygen conc. vol % | free cobalt oxide conc. (wt %) | discharge cap. (mAh/g) | cap. holding rate (%) |
| Ex 1 | 0.5 | 20 | 0.3 or less | 135 | 95 |
| Ex 2 | 0.6 | 5 | 0.5 | 130 | 93 |
| Ex 3 | 0.6 | 10 | 0.4 | 132 | 95 |
| Ex 4 | 0.6 | 20 | 0.3 or less | 135 | 96 |
| Ex 5 | 0.6 | 40 | 0.3 or less | 136 | 96 |
| Ex 6 | 1.0 | 20 | 0.4 | 132 | 96 |
| Ex 7 | 2.0 | 20 | 0.4 | 133 | 94 |
| Ex 8 | 5.0 | 20 | 0.5 | 125 | 90 |
| CE 1 | 0.6 | 0 | 2.0 | 80 | 60 |
| CE 2 | 0.6 | 2 | 1.0 | 100 | 70 |

TABLE 1-continued

| | firing conditions | | | cell performance | |
|---|---|---|---|---|---|
| | heating rate °C./min | oxygen conc. vol % | free cobalt oxide conc. (wt %) | discharge cap. (mAh/g) | cap. holding rate (%) |
| CE 3 | 7.0 | 20 | 0.8 | 120 | 85 |
| CE 4 | 10.0 | 20 | 1.0 | 100 | 80 |
| CE 5 | 20.0 | 20 | 1.5 | 90 | 70 |

Note:
(1) Heating rate in a temperature region of from 500 to 900° C.
(2) Oxygen concentration represents concentration in the furnace atmosphere.
(3) The free cobalt oxide ($Co_3O_4$) content is the content in lithium cobaltate.
(4) Ex and CE mean Example and Comparative Example, respectively.

The results shown in Table 1 suggest that all the lithium cobaltate based positive electrode-active materials of the present invention manufactured in the Examples have a free cobalt oxide ($Co_3O_4$) content of up to 0.5% by weight, have excellent discharge capacity and capacity holding rate, and exhibit high energy density. In contrast, in the Comparative Examples in which the firing atmosphere had an oxygen concentration of less than 5% by volume and/or the heating rate at a heating temperature of at least 500° C. did not satisfy the requirement of up to 5° C./minute, no lithium cobaltate having a free cobalt oxide ($Co_3O_4$) content of up to 0.5% by weight was available, leading to much poorer discharge capacity and capacity holding rate.

According to the present invention, as described above, it is possible to provide a lithium cobaltate based positive electrode-active material which is excellent in discharge capacity and capacity holding rate and gives a high energy density, suitable for a lithium secondary cell. According to the manufacturing method of the present invention, furthermore, it is possible to industrially produce the foregoing high-performance lithium cobaltate based positive electrode-active material for a lithium secondary cell with high reproducibility.

While the invention has been described in detail and with reference to specific embodiments thereof, it will be apparent to one of ordinary skill in the art that various changes and modifications can be made therein without departing from the spirit and scope thereof.

What is claimed is:

1. A method of manufacturing a lithium cobaltate based positive electrode-active material for a lithium secondary cell comprising:

heating a mixture of lithium carbonate and cobalt oxide to a firing temperature of 600° to 1100° C. from a heating temperature of 500° C. or more at a rate of 0.5 to 5° C./min, and firing said mixture while the temperature is raised at said rate for a firing time, while controlling the oxygen concentration in the firing atmosphere to at least 5% by volume, thereby converting the mixture into lithium cobaltate.

2. The method of claim 1, wherein the firing time is at least 2 hours.

3. The method of claim 2, wherein the firing time is from about 5 to 15 hours.

4. The method of claim 1, wherein the maximum firing temperature is 900° C.

5. The method of claim 1 wherein the oxygen concentration in the firing atmosphere is 10 to 20% by volume, and the heating rate is 2–0.6° C./min at a heating temperature of 500° C. or more.

6. A lithium cobaltate based positive electrode-active material for a lithium secondary cell consisting of lithium cobaltate ($LiCoO_2$) having 0.5% by weight or less of free cobalt oxide ($Co_3O_4$) obtainable by a method comprising:

heating a mixture of lithium carbonate and cobalt oxide to a firing temperature of 600° to 1100° C. from a heating temperature of 500° C. or more at a rate of 0.5 to 5° C./min, and firing said mixture while the temperature is raised at said rate for a firing time, while controlling the oxygen concentration in the firing atmosphere to at least 5% by volume, thereby converting the mixture into lithium cobaltate.

7. The material of claim 6, wherein the amount of free cobalt oxide ($Co_3O_4$) is 0.3% by weight or less.

* * * * *